Figure 1:
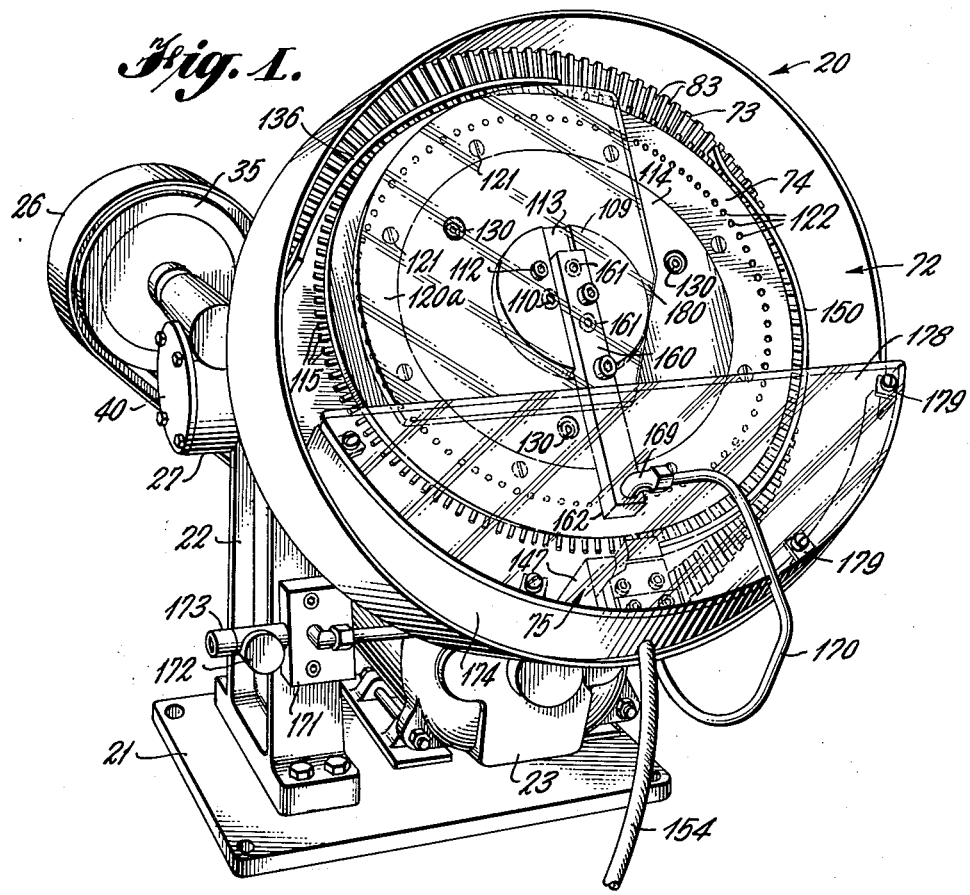

Feb. 20, 1962 R. F. GLADFELTER ETAL 3,021,980
HIGH SPEED PARTS FEEDER
Filed March 9, 1960 6 Sheets-Sheet 1

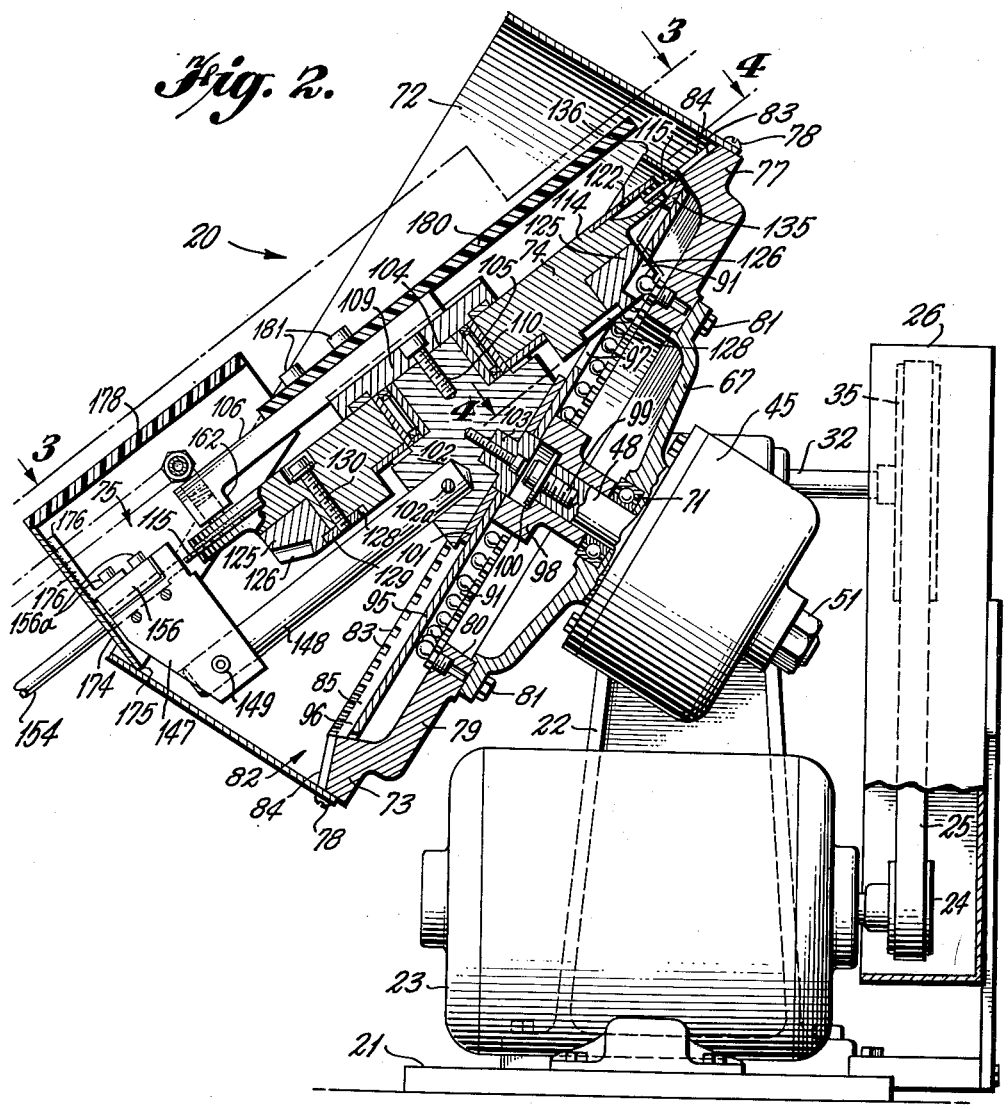
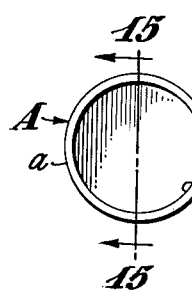

Feb. 20, 1962 R. F. GLADFELTER ETAL 3,021,980
HIGH SPEED PARTS FEEDER
Filed March 9, 1960 6 Sheets-Sheet 5
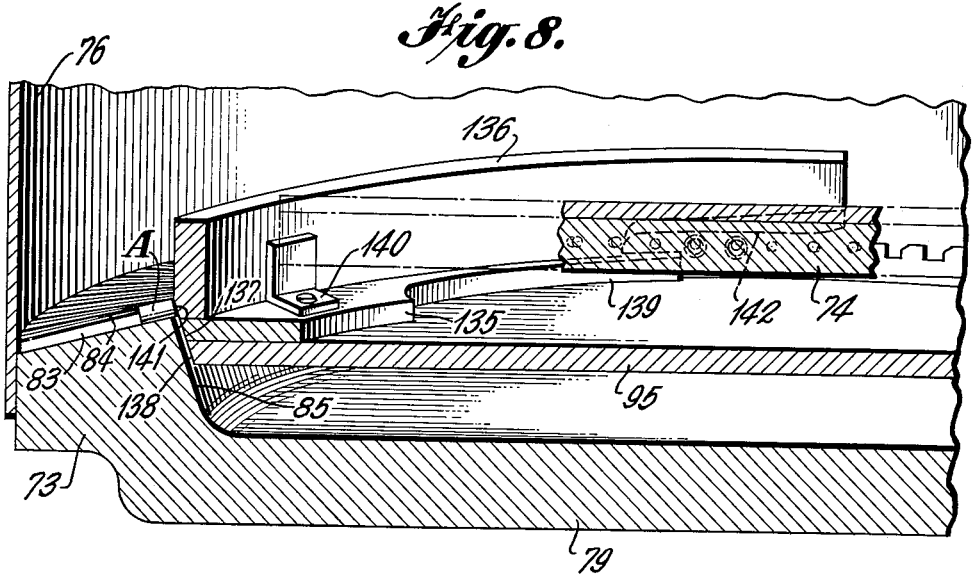
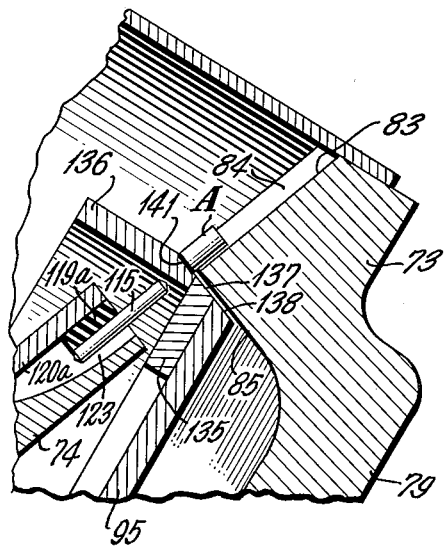
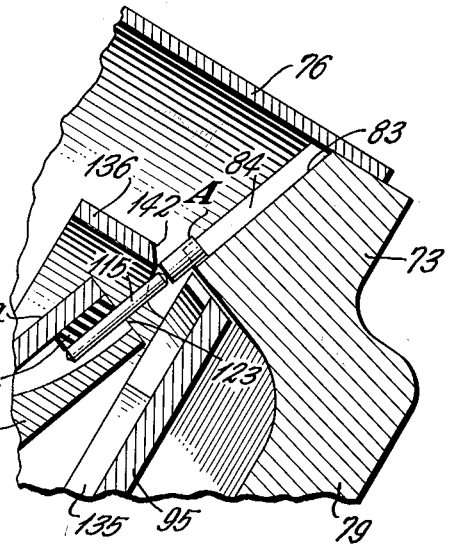
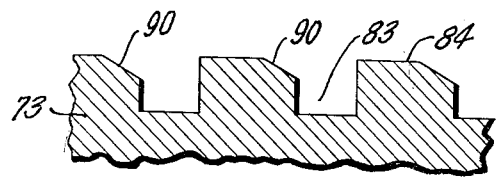

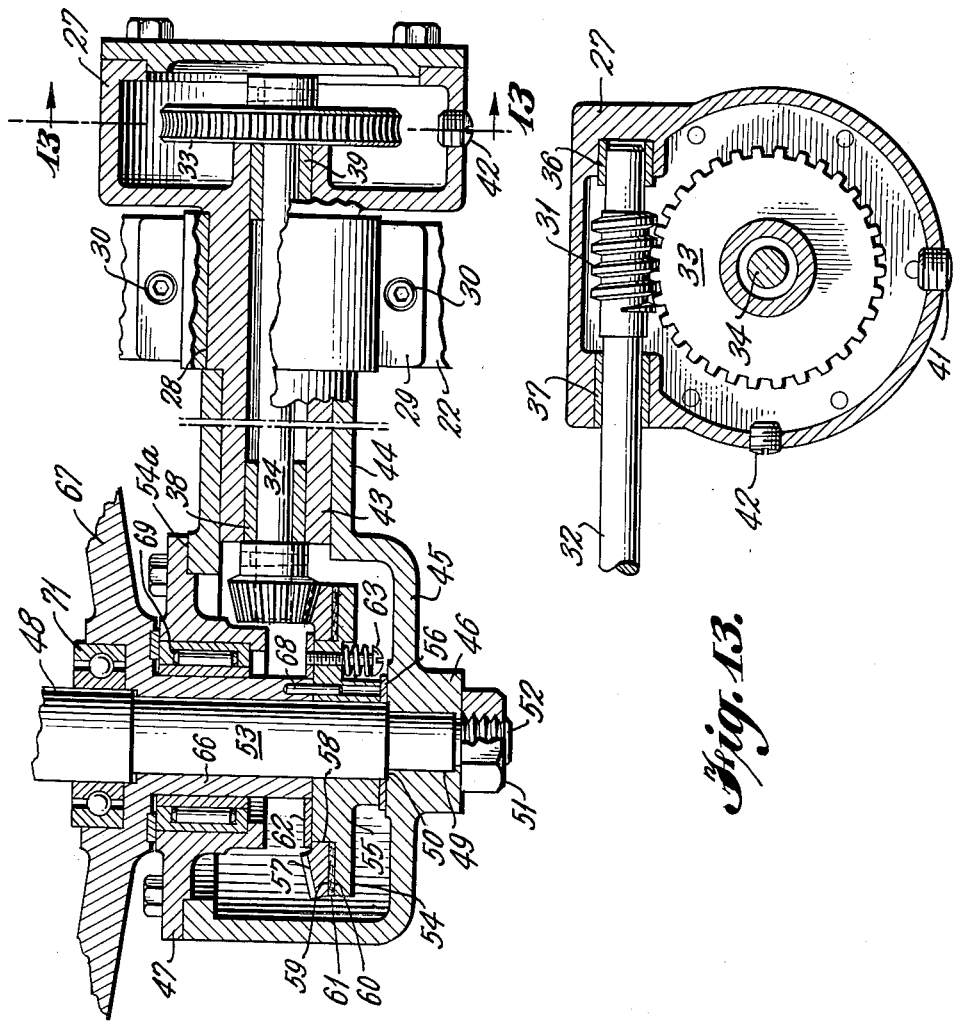

United States Patent Office 3,021,980
Patented Feb. 20, 1962

3,021,980
HIGH SPEED PARTS FEEDER
Robert F. Gladfelter, Birmingham, and John T. Faull and Everett Gill, Detroit, Mich., assignors to Detroit Power Screwdriver Company, a corporation of Michigan
Filed Mar. 9, 1960, Ser. No. 13,791
16 Claims. (Cl. 221—167)

This invention relates to apparatus for orienting and feeding small mechanical parts, and deals more particularly with a high speed, hopper type feeder for handling tubular or elongated hollow parts, each of which has an opening at only one end.

The primary object of this invention is to provide a rotatable hopper type feeder which will rapidly collect from a loose mass of identical mechanical parts positioned therein, each of said parts being of generally tubular or elongated hollow shape with an opening at only one end, and select and feed the said parts singly and successively, in an oriented condition, out of the feeder in readiness for delivery to an assembling machine, or the like.

A further object of the invention is to provide a feeder of the above mentioned type in which the rotatable hopper is provided with mechanism for collecting the individual tubular parts from a loose mass of the same which is tumbling around in the bottom portion of the hopper and elevating the collected parts in a partially oriented condition, or as an annular series with all of the parts arranged or extending radially of the spin axis of the hopper but without any orientation of the parts with reference to their differently constructed, opposite ends; and in which a separately rotatable mechanism is operatively associated with the collecting mechanism of the hopper for selecting only the parts which are arranged in a certain manner with reference to their differently constructed, opposite ends, and for rejecting the parts which are not arranged in said certain manner, so that the rejected parts will be returned to the loose mass in the hopper; the separately rotatable mechanism further functioning to feed the selected parts singly and successively in a completely oriented condition out of the feeder in readiness for delivery to a separate machine which may assemble them in any desired manner with other, dissimilar mechanical parts.

Another object of the invention is to provide a hopper type feeder as described above in which the collecting mechanism forms a fixed part of the hopper bottom and is so constructed and arranged that its movement relative to the loose, tumbling mass of parts partially supported thereon will enable the said mechanism to separate from the mass a substantially continuous series of parts which are oriented so as to extend radially of the spin axis of the hopper.

Still another object of the invention is to provide a selector mechanism for the above hopper type feeder which is so constructed and arranged that the mechanical parts which are properly oriented on the collecting mechanism in said certain manner with reference to their differently constructed, opposite ends may be fed by gravity from the collecting mechanism to the selecting mechanism, and the selecting mechanism will then carry the completely oriented parts to a delivery location where they will be discharged from the feeder by the combined action of gravity and an air blast.

A further object of the invention is to so drivingly interconnect the selecting mechanism and the collecting mechanism that both of said mechanisms will rotate in perfectly timed relationship so that each location on the collecting mechanism which carries a mechanical part will always register with a corresponding location on the selecting mechanism to which the part may be fed if the said part is properly oriented with reference to its differently constructed, opposite ends.

A still further object of the invention is the provision of a hopper type feeder for identical mechanical parts in which an annular collector member, provided with a circular series of spaced radially extending slots, is rotated about an inclined axis which will cause the slots, as they pass through the top dead center of the annular member, to be inclined downwardly toward the axis of said member so to discharge by gravity parts that have been picked up in the slots; and in which a selector wheel member, provided with an annular series of spaced radial pins, is rotated in a plane which will cause the pins, as they pass through the top dead center of the wheel, to be axially aligned with the correspondingly positioned slots to permit parts to be transferred from the slots to the pins.

A more specific object of the invention is to provide a hopper type feeder in which the collector mechanism includes an annular member supported for rotation about an inclined axis and is provided with a series of angularly spaced, radially extending slots formed in an annular portion of its top surface which has the shape of a truncated cone; and in which the selector mechanism includes a wheel member supported above the said annular member for rotation about an axis which is inclined at a greater angle to the horizontal than the hopper axis, or at an angle of 90° to the axis of each of said slots as the latter passes through the top dead center of said annular member with the wheel member having a diameter that is sufficiently smaller than the inside diameter of the said annular member to permit the wheel member to rotate with its periphery spaced a desired distance radially inwardly of the inside diameter of the said annular member at the top dead centers of the annular and wheel members; whereby an annular series of pins, equal in number to that of the slots, may be mounted in the periphery of the wheel member to extend radially therefrom, in a common plane that is normal to the wheel axis, with the result that the pins and slots will be successively, axially aligned with each other when they are positioned at the top dead centers of their respective members to provide a transfer point where the mechanical parts, having their end openings pointing inwardly, may move by gravity from the slots onto the pins.

Other objects and advantages of the invention will be apparent during the course of the following description.

Figure 4:
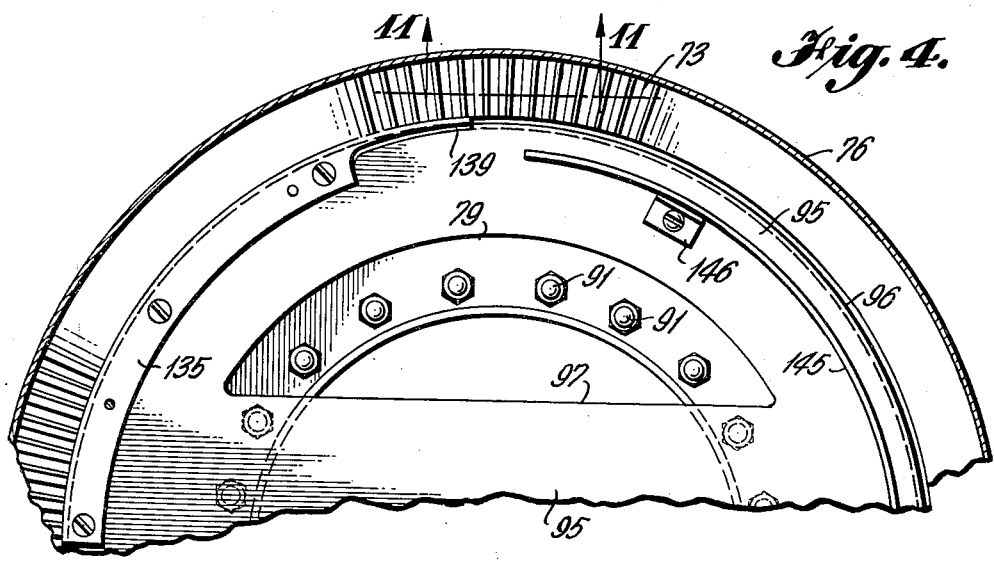
Figure 3:
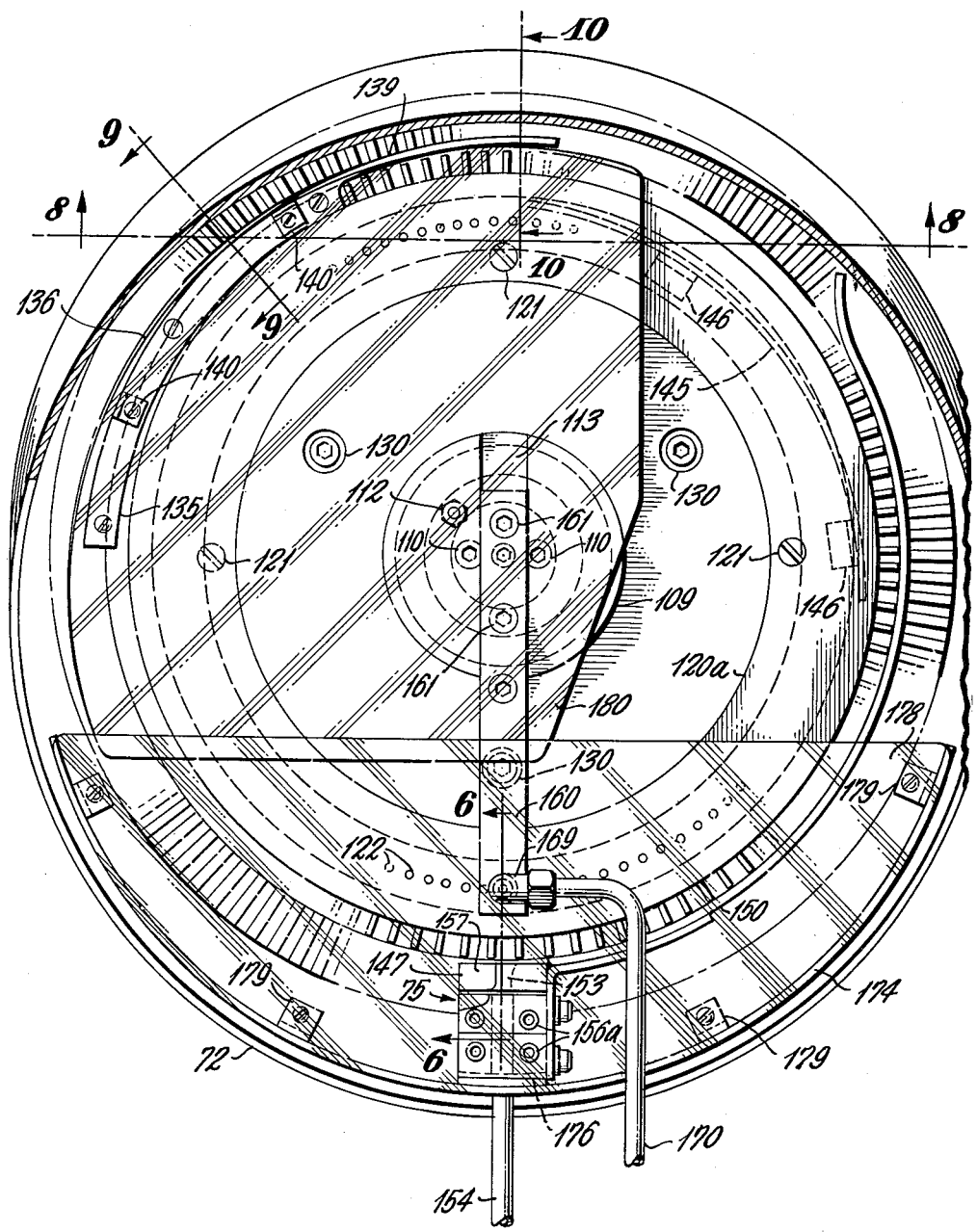
Figure 6:
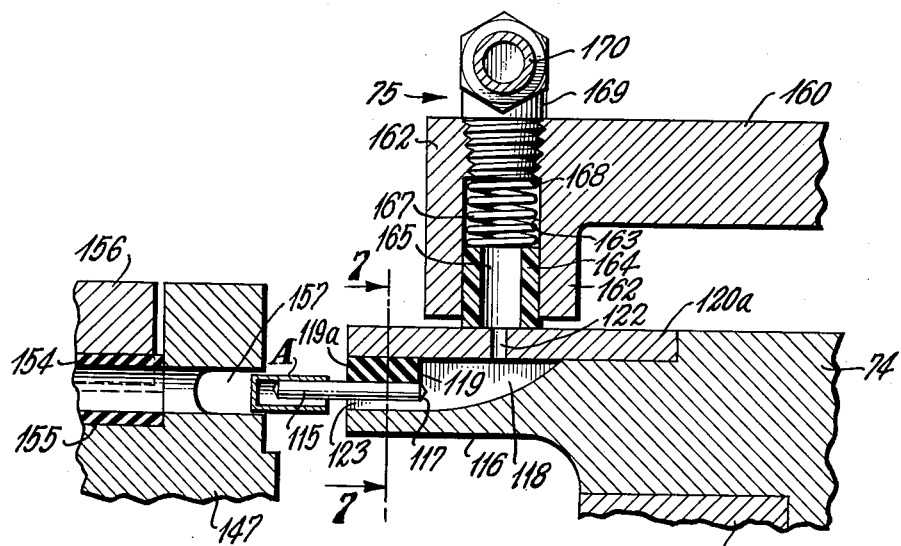
Figure 7:
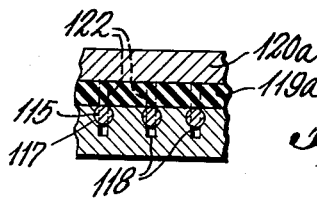
Figure 5:
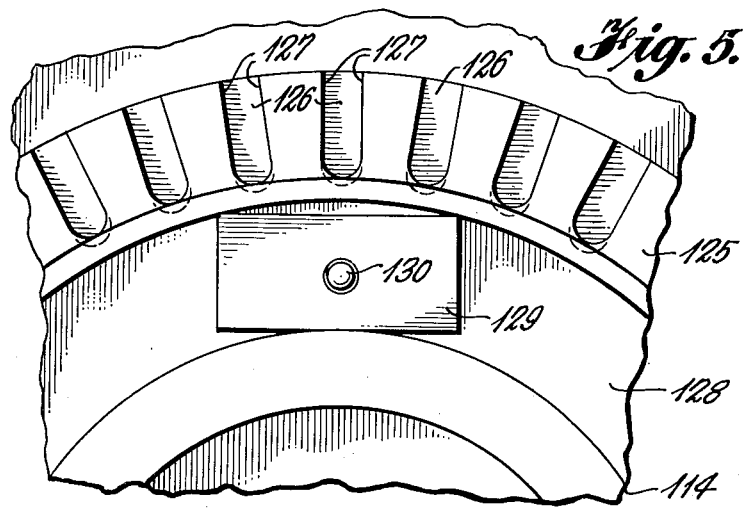

In the accompanying drawings forming a part of this specification and in which like numerals are employed to designate like parts throughout the same, FIGURE 1 is a perspective view of a hopper type feeder embodying the present invention, FIGURE 2 is a side view, partly in section and partly in elevation, of the hopper type feeder shown in FIG. 1, FIGURE 3 is a front elevational view of the collecting and selecting mechanisms of the feeder shown in FIG. 1, FIGURE 4 is a fragmentary sectional view taken on line 4—4 of FIG. 2, FIGURE 5 is a fragmentary bottom plan view of the selector wheel employed in the feeder shown in FIG. 1, FIGURE 6 is an enlarged sectional view taken on line 6—6 of FIG. 3, FIGURE 7 is a sectional view taken on line 7—7 of FIG. 6, FIGURE 8 is an enlarged sectional view taken on line 8—8 of FIG. 3, FIGURE 9 is an enlarged sectional view taken on line 9—9 of FIG. 3, FIGURE 10 is an enlarged sectional view taken on line 10—10 of FIG. 3, FIGURE 11 is an enlarged sectional view taken on line 11—11 of FIG. 4, FIGURE 12 is a sectional view showing the drive mechanism for the hopper type feeder of FIG. 1, FIGURE 13 is a sectional view taken on line 13—13 of FIG. 12, FIGURE 14 is an enlarged end view of a mechanical part of the kind to be handled by the hopper type feeder of FIG. 1, and FIGURE 15 is a sectional view taken on line 15—15 of FIG. 14.

In the drawings, wherein for the purpose of illustration is shown the preferred embodiment of this invention, and first particularly referring to FIGS. 1 and 2, there is shown a hopper type parts feeder, designated generally by the reference character 20. This feeder includes a flat base plate 21 adapted to be secured to a suitable support. On the base plate 21 is mounted an upright post 22, an electric motor 23 having a pulley 24 on its output shaft for driving a belt 25, and a guard 26 for the belt.

On the top of the post 22 is mounted the feeder drive mechanism which, as best seen in FIG. 12, includes a first housing 27 having a cylindrical portion 28 which is secured to the post 22 by a split clamp, with the detachable top half 29 fastened to the post by a pair of bolts 30. As viewed in FIGS. 12 and 13, a portion of the housing 27 encloses a worm gear drive consisting of a worm 31 fastened to the input shaft 32 and a worm gear 33 fixed to a countershaft 34. As shown in FIG. 2, the input shaft 32 has a pulley 35 fixed thereto which is driven by the motor 23 through the belt 25. The input shaft 32 is journaled in the housing 27 by two sleeve bearings 36 and 37, as shown in FIG. 13, while the countershaft 34 is similarly journaled in the housing 27 by two sleeve bearings 38 and 39 located at opposite ends of the housing, as shown in FIG. 12. The outer end of the housing 27 is closed by a removable cap 40. A lubricant drain plug 41 and a fill plug 42 are provided for the housing 27.

The inner end portion 43 of the housing 27 is reduced in diameter and is telescoped in an extension 44 of a second housing 45. The two housing portions 43 and 44 are held against relative movement by any suitable means, not shown.

Except for the extension 44, the housing 45 is generally cup-shaped and includes an apertured boss 46 in one end wall and a removable cover 47 as the other end wall. A stationary arbor 48 extends into the housing 45 through the cover 47 and has a reduced end portion 49 which fits through the apertured boss 46. A shoulder 50 on the arbor seats against the inner face of the end wall having the boss and the arbor is rigidly secured to the housing 45 by a nut 51 threaded onto the portion 52 of the arbor. Within the housing 45, the arbor portion 53 has a bevel gear 54 rotatably mounted thereon which is driven by a bevel pinion 54a fastened to the end of the countershaft 34 which enters the housing 45 through the extension 44.

The bevel gear 54 comprises a hub portion 55 spaced from the inner surface of the boss 46 by a thrust washer 56, and a toothed ring member 57 that fits into an annular recess 58 in the periphery of the hub 55. Between the axially opposed surfaces 59 and 60 of the ring 57 and hub 55, respectively, is a ring 61 of friction material. The ring 57 is held in place on the hub 55 by a washer 62 fastened to the hub 55 by one or more spring loaded screws 63, as shown in FIG. 12, with the radially outer portion of the washer overlying part of the ring 57 and tending to clamp it against the friction ring 61.

Driving torque imparted to the ring 57 by the bevel pinion 54a is therefore imparted to the hub 55 through the friction ring 61 so that slippage between the ring and the hub may occur if an undue load is imposed on the hub.

The bevel gear 54, therefore, in effect functions as an overload slip clutch. The amount of torque at which slippage will occur can be varied by adjusting the screws 63 to change the clamping pressure on the friction ring.

Also loosely mounted on the arbor portion 53 is a sleeve 66 which is integral with the hub 67 of a hopper structure which will be described in detail at a later point. At its lower end, the sleeve 66 is connected to the hub 55 of the bevel gear 54 by a pin 68 so as to be rotated thereby. A roller bearing 69 rotatably supports the sleeve 66 with respect to the cover 47 of the housing and a felt ring 70 in the hub 67 serves as a seal between the hub and the housing cover to prevent the entry of foreign material to the bearing 69 and the interior of the housing 45. A ball bearing 71 is employed between the hub 67 and the arbor 48, as shown in FIG. 12, to provide a relatively friction-free mounting for the hub.

The feeder embodying this invention is designed for handling small mechanical parts which are of identical size and shape. One of such parts A is illustrated in FIGS. 14 and 15 as consisting of a tubular or elongated hollow body portion $a$ which is cylindrical in cross-section and is entirely closed at its end $b$ and is entirely open at its end $c$. It will be appreciated, however, that the construction and mode of operation of the illustrated feeder may be employed for handling larger or smaller parts than those shown and that the tubular or hollow body portions need not be of truly cylindrical shape in cross-section.

Referring again to FIGS. 1 and 2 for a detail description of the mechanism which actually performs the orienting and feeding functions, it will be observed that the feeder 20 includes a hopper having a peripheral wall 72; a slotted collector ring 73 which is connected to the hub 67 to form therewith the bottom of the hopper which receives a loose mass of the parts to be oriented and fed therefrom, the said collector ring functioning to pick up the parts in its slots to thereby separate the individual parts from the loose mass; a selector wheel 74 having a plurality of pins projecting radially from its periphery for selectively receiving or rejecting the parts from the slots of the collector ring; and delivery means 75 located adjacent the bottom portion of the selector wheel 74 for receiving the parts from the said pins. The hopper wall 72 is cylindrical in shape and preferably is formed of sheet metal with its lower edge fastened to the outer periphery 77 of the collector ring 73 by a plurality of screws 78.

The collector ring 73 is dished to provide a main body portion 79 which is fastened at its inner margin 80 to the hub 67 by bolts 81, as shown in FIG. 2. The hopper wall 72 and the collector ring 73, therefore, rotate with the hub 67 about the axis of the arbor 48, with the hub being driven by the mechanism previously described with reference to FIG. 12. From FIG. 2, it will be noted that the housing 45 is so positioned that the arbor 48 is inclined with respect to the horizontal and, therefore, the collector ring 73 will rotate in an inclined plane that is perpendicular to the axis of the arbor. The hopper faces generally upwardly and outwardly so that the parts supplied to the hopper will collect as a loose mass, not shown, at the lowermost portion 82 thereof with the mass being displaced somewhat to one side of the central vertical plane of the hopper due to the rotation of the latter.

To enable the collector mechanism to pick up the individual tubular parts from the loose mass of the same that is tumbling around in the bottom portion 82 of the rotating hopper, the collector ring 73 is illustrated in FIGS. 1 to 4 and 8 to 10 as having formed therein a series of radially extending, angularly spaced slots 83. It will be noted from FIGS. 2, 8 and 10 that the slots 83 are formed in an annular surface portion 84 of the ring 73 which has the shape of a truncated cone. The axes of the slots, as they pass through the top dead center of the ring, are inclined or slope downwardly. Therefore, the parts A are arranged radially of the spin axis of the hopper and are oriented to that extent. However, they are not oriented with reference to their differently constructed, opposite ends.

The outer ends of all of the slots 83 are closed by the hopper wall 72 while the inner ends open through the wall 85 of the dished main body portion 79 of the collector ring 73, or toward the spin axis of the ring 73. Each slot 83 is of sufficient depth and width to freely receive the parts A as the slots move under the loose mass at the bottom portion of the hopper and the inclined angle assumed by the slots as they pass through the top dead center of the ring 73 provides sufficient gravitational force to effect discharge of the parts radially inwardly or toward the axis of the ring 73. To assist the parts A in entering the slots 83 one of the outer edges of each slot is beveled, as at 90 in FIG. 11.

As illustrated in FIGS. 2 and 4, the main body portion 79 of the collector ring 73 is provided with a circular series of spaced driving studs 91 which are threaded into the inner edge portion of the main body 79 and extend axially upwardly or in parallelism with the axis of the ring 73. As seen best in FIGS. 2, 4 and 8 to 10, a circular disc or plate 95 is positioned within the dished portion 79 of the collector ring 73 with its edge 96 closely positioned to the wall 85 of said ring 73. FIGS. 2 and 4 show the disc or plate 95 as being formed with an opening 97 which exposes the driving studs 91 while they move through the upper portion of their path of travel with the rotating ring 73. The disc or plate 95 serves as a floor for the dished portion 79 of the ring 73 to support the loose mass of the parts A in the hopper and prevent them from interfering with the driving studs 91.

The floor disc or plate 95, as shown in FIG. 2, is mounted on an enlarged head 98 fixed to the outer end of the arbor 48 by a bolt 99 and washer 100. Also mounted on the head 98 is a spacer plate 101 and a selector wheel mounting block 102. Fastened to the center of the inner portion of the mounting block 102 is a pilot plug 103 which extends outwardly from the block and projects through apertures in the spacer plate 101 and floor disc or plate 95 for the purpose of aligning the plates centrally with respect to the block during assembly. The mounting block 102, the spacer plate 101, the floor plate 95 and the head 98 are all fastened together as a unit by bolts, not shown, which extend through the block and the two plates, and are threaded into the head 98.

For supporting the selector wheel 74, the fixed mounting block 102 is provided with a journal 104 having an axis that is inclined at a greater angle to the horizontal than the hopper axis, or at an angle of 90° relative to the axis of each of said slots 83 as it passes through its top dead center. The selector wheel 74 is mounted for rotation about the journal 104 by the roller bearing 105 and is of such a diameter that its periphery will be spaced radially inwardly of the inside diameter of the collector ring 73 at the top dead center of the latter to provide a space of desired radial dimension, as seen in FIGS. 2, 6, 7 and 8.

The selector wheel 74 and the roller bearing 105 are held in place on the journal 104 by the retainer 109 and two bolts 110. A conventional grease fitting 112 is illustrated in FIGS. 1 and 3 for supplying lubricant to the bearing 105. The upper surface of the retainer 109 is provided with a transverse groove 113, as seen in FIGS. 1, 2 and 3, for a purpose to be explained at a later point.

Referring now to FIGS. 1, 2, 3, 6 and 7 for a detail description of the selector wheel 74, it will be noted that this part includes a main body 114 which is annular in shape and has a plurality of pins 115 extending radially outwardly in a common plane from the outer periphery thereof and disposed at angularly spaced positions with respect thereto. The pins 115 correspond in number with the slots 83 and the axes of the pins, as they pass through the top dead center of the wheel 74, are all aligned with their respective slots 83 as the latter pass through the top dead center of the ring 73.

The manner in which the pins 115 are fastened to the selector wheel 74 is best shown in FIGS. 6 and 7. It will be noted that the peripheral portion 116 of the main body 114 is drilled at equally spaced points along its circumference to provide radially extending holes 117 for receiving the pins 115. The holes 117 are just slightly smaller in diameter than the pins 115 so that the latter may be press fitted, or driven, therein. The pins are approximately twice the length of the holes 117. By means of a rotary saw, the peripheral portion 116 is cut to provide a radially extending slit 118 in the upper surface thereof which is centered with each of the openings 117. Each of the slits 118 is narrower than the diameter of its hole, is longer in radial length than the hole and is cut to a depth below the hole along the length of the latter. The depth of the slits is gradually decreased beyond the inner ends of the holes 117 with the slits finally terminating some distance inwardly thereof.

The peripheral portion 116 of the body of the wheel 74 is machined to provide the two cutaway or chamfered edges 119 and 120. The chamfered edge 119 has positioned therein the rubber gasket ring 119a which is held in place, and the inner end portions of all of the slits 118 are closed, by an annular plate 120a which is held in place by the screws 121, see FIGS. 1 and 3. The annular plate 120a has a circular series of openings 122 formed therethrough which communicate with the slits 118. As seen best in FIGS. 6, 9 and 10, a flow path is formed from each opening 122 through its slit 118 to the opening 123 which underlies the associated pin 115. As will be brought out in more detail later, this flow path serves to conduct pressurized air to the vicinity of the pin for blowing the part A therefrom.

In order that the outer tips of the pins 115 on the selector wheel 74 may be driven at the same speed as the inner ends of the slots 83 formed in the collector ring 73, the wheel, as best seen in FIGS. 2, 5 and 6, has a separate ring 125 seated in a chamfered bottom edge thereof. The ring 125 has formed therein a circular series of angularly spaced grooves 126 which receive the studs 91 mounted in the marginal portion 80 of the collector ring 73. This meshing of the studs 91 and the grooves 126 only occurs in the upper segment of the assembly, as seen in FIG. 2, where the driven ring 125 of the selector wheel projects through the opening 97 formed in the floor disc or plate 95 of the collector ring 73. The grooves 126 are each formed with straight side walls 127 which are spaced apart a sufficient distance to closely fit the upper end portions of the studs to provide a minimum amount of backlash between the selector wheel and the ring 79.

The ring 125 is shown in FIGS. 2 and 5 as being fastened to the body 114 of the selector wheel for angular adjustment relative to the body to properly align or register the pins 115 of the selector wheel 74 with their respective slots 83 in the collector ring. The ring 125 and the selector wheel body 114 are both recessed in their bottom surfaces to provide an annular groove 128. Three clamping plates 129 are disposed in the groove 128 at angularly spaced positions and each is fastened to the body 114 by a bolt 130. Each of the plates extends over a portion of the ring 125 and will hold the ring fixed to the body 114 when its bolt 130 is tightened.

The manner in which the parts A are selectively transferred to the pins 115 from the slots 83 is best illustrated in FIGS. 1 to 4, 6, 8, 9 and 10. As previously stated, the transfer point is located at the top dead centers of the selector wheel 74 and the collector ring 73 because it is at that point where the axes of the pins 115 are in exact alignment with the axes of their respective slots.

As viewed in FIGS. 1, 3 and 4, the hopper, including the collector ring 73, is rotated in a clockwise direction so that the parts A which are picked up by the slots 83 from the loose mass in the bottom portion 82 of the hopper are carried up the left-hand side of the ring. To prevent the parts from falling through the inner ends of the slots 83 as they are elevated above the horizontal center line of the ring, the bottom plate 95 has mounted thereon an arcuate guard assembly comprising a mounting plate 135 and a guard rail 136. The mounting plate 135 is fastened to the stationary floor disc or plate 95 along the upper left-hand quadrant thereof with its outer edge 137 aligned with the outer edge 138 of the disc or plate 95. Both of these edges 137 and 138 are beveled to conform to the inner surface of the wall 85 of the collector ring. The upper end 139 of the plate 135, see FIGS. 3, 4 and 8, terminates short of the top dead center and is cut away along the inner edge thereof to avoid interfering with the selector wheel.

The guard rail 136 is fastened to the top of the mounting plate 135 by two brackets 140. It is arcuate in shape to conform to the curvature of the edges 137 and 138 of the plates 135 and 95 and, as shown in FIG. 3, extends from a point some distance above the horizontal center line of the feeder to a point some distance beyond the top dead center. Along the major portion of its length, the bottom edge of the guard 136 is beveled to provide a surface 141 that is aligned with the beveled edges 137 and 138. This beveled surface 141 is positioned directly adjacent the open inner ends of the slots 83 of the collector ring and serves to hold the parts A in the slots as the parts travel through the upper left-hand quadrant of the collector ring's path of movement.

As seen best in FIGS. 8 and 10, as the guard rail 136 approaches the top dead center, or the transfer point, the guard rail 136 has its bottom edge cut away and beveled, as at 142, to permit the parts A to pass underneath the guard rail and fall from the slots onto their respective pins 115. FIGURE 10, for example, shows a part just on the verge of passing under the guard rail 136, through the cutout portion 142, and onto its pin 115.

At this point it will be understood that as the parts pass under the guard rail 136 at the transfer point, only those parts which have their open ends c facing downwardly toward the pins will be able to move onto the latter. Those parts which have their closed ends b facing toward the pins will be rejected by the latter and will fall back to the loose mass at the bottom of the hopper after moving a sufficient distance beyond the transfer point to provide a space or gap of sufficient width between the outer ends of the pins 115 and the inner ends of the slots 83 to permit the parts to fall therethrough. This space or gap develops in width because of the angle formed between the plane that is common to the axes of the pins and the plane that is common to the inner ends of the axes of the slots 83.

By comparing the length of a part A with the length of each slot 83, as seen in FIGS. 8, 9 and 10, it will be appreciated that each slot may pick up two or more parts A while it is moving underneath the loose mass of parts in the bottom portion of the hopper. However, the pins 115 and slots 83 are only in axial alignment at the transfer point a sufficient length of time to allow for the transfer or rejection of the innermost part that is positioned in a slot. Therefore, any parts that remain in a slot, after the latter has passed the transfer point, will be permitted to fall back into the bottom of the hopper through the aforesaid space or gap.

To prevent any of the parts that fall through the said space or gap from passing through the opening 97 in the floor disc or plate 95, a deflector rail 145 is mounted on the floor and extends around the right-hand upper quadrant. The rail is secured in place by the brackets 146, as shown in FIGS. 3 and 4.

The parts A which are positioned on the pins 115 at the transfer point are carried by the movement of the selector wheel 74 to the delivery means 75 located at the bottom dead center of the wheel path, see FIGS. 1, 2 and 3. As shown in FIG. 2, the delivery means 75 includes a receiving block 147 that is supported from the selector wheel mounting block 102 by a rigid bar 148. The opposite ends of the bar are received in holes drilled in the blocks 102 and 147. A pin 102a secures the bar in the hole of the block 102. A set screw 149 is employed for adjustably securing the block 147 to the bar so that the distance between the block and the outer ends of the pins 115 may be varied.

To the upper portion of the receiving block 147, as shown in FIGS. 1, 3 and 6, is attached an arcuate guide 150 which extends from the block 147 around the selector wheel 74 to a point some distance above the horizontal center line of the hopper. The inner, vertical surface of the guide 150 is positioned in closely spaced relation to the outer ends of the pins 115 so as to hold the parts A on the pins until the parts reach the selector wheel unloading zone, as represented by the receiving block 147. In its inner portion, the receiving block 147 is formed with a throat 153, as seen best in FIGS. 3 and 6, which is positioned in alignment with the pins 115 passing the block so as to receive the parts A that are unloaded from the pins. The throat 153 opens into a delivery tube 154 which guides the parts to a point of use, which usually is an assembling machine of some form. The end of the tube 154 associated with the block 147 is received in a semicylindrical seat 155 formed in the top of the block and is secured thereto by a complementary clamp member 156 fastened to the block by bolts 156a. Adjacent the trailing side of the throat 153, the block 147 is cut away at 157 so that any parts which are unloaded into the throat 153 and which are prevented from passing into the delivery tube 154, because of the fully loaded condition of the latter, may be discharged from the block 147 and returned to the hopper.

The relative positions of the receiving block 147 and the pins 115 are such that the parts positioned on the pins will drop by gravity into the throat 153 if the selector wheel is rotated at a relatively slow speed. To permit the selector wheel to be rotated at a higher rate of speed and to correspondingly increase the rate of delivery of the parts to the tube 154, a jet of air is applied individually to each part as it passes the delivery means 75 to blow the parts from the pins into the throat 153 of the delivery block.

This is accomplished by providing a mounting arm 160 which is fastened at its upper end portion in the slot 113 of the retainer 109 by two screws 161. The mounting arm 160 extends downwardly along the vertical center line of the hopper from the retainer and has an enlarged lower end portion 162 positioned above the path of the circular series of openings 122 in the plate 120a. A bore 163 is formed in the enlarged end portion 162, as shown in FIG. 6, and receives with a snug, sliding fit a cylindrical nozzle tip 164 which in turn has a bore 165 formed completely through the length thereof. The bore 165 provides an opening at the lower end of the nozzle tip which is somewhat larger than a single opening 122 and registers with the path of the openings so that the latter are brought successively into alignment therewith by the rotation of the selector wheel 74.

The nozzle tip 164 is resiliently pressed against the upper surface of the plate 120a by a spring 167 disposed between the upper end of the nozzle tip 164 and a shoulder 168 at the upper end of the bore 163. A conventional coupling 169, threaded into the free end portion 162 of the mounting arm, communicates with the bore 163 and with an air line 170 for supplying pressurized air to the bore. The line 170, see FIG. 1, is in turn connected to a block 171 which is mounted on the post 22 and which includes a regulating valve 172 for adjusting the pressure in the line 170 and a coupler 173 for making connection with a conventional source of pressurized air, not shown.

From FIG. 6, it will be seen that as each one of the openings 122 passes under the nozzle tip 164, air will be conducted from the line 170 through the bores 163 and 165, an opening 122, and the associated slit 118 to the outer end 123 of the latter. The air jet issuing from the said outer end 123 will travel along the associated pin 115 and will impinge against the part supported on the pin in such a manner as to blow the part directly into the throat 153.

Normally an air supply of from ten to thirty p.s.i.g. in the line 170 will produce satisfactory results. With the use of the air assist for unloading the selector wheel, together with the improved means for loading the same at the upper portion thereof, a parts feeder of the type disclosed with one hundred twenty mating slots 83 and pins 115 will perform entirely satisfactorily at selector wheel speeds of from 3 to 10 r.p.m. At an operating speed of 8 r.p.m., more than four hundred parts per minute, or about seven parts per second, have been delivered, properly oriented, to the tube 154.

In order to enclose and protect the delivery mechanism 75, a stationary, upstanding wall section or shield 174 is provided for the lower portion of the hopper. The lower edge 175 of the wall section is positioned inside the revolving hopper wall 72 and is fastened to the receiving block 147 by the bracket 176 which is welded to the wall section and is fastened to the block by the bolts 156a which secure the tube clamp 156 in place. A clear plastic cover 178 is attached to the upper edge of the wall section 174 by means of the brackets 179. A second clear plastic cover 180 is fastened to the mounting arm 160 by the two bolts 181. This last cover overlies the upper left-hand quarter section of the hopper, or the side of the feeder up which the parts A are moved by the collector ring 73. It will be noted from FIG. 3 that a portion of the upper right-hand quarter section of the hopper is left uncovered and is used for introducing the loose parts into the hopper.

It is to be understood that the form of this invention herewith shown and described is to be taken as a preferred example of the same, and that various changes in the shape, size, and arrangement of parts may be resorted to without departing from the spirit of the invention or the scope of the subjoined claims.

Having thus described the invention, we claim:

1. A high speed feeder for tubular parts having only one open end, comprising a hopper mounted on a fixed support for rotation about an axis that is inclined to the horizontal, a collector ring forming a part of the bottom of the hopper and having an annular series of radially extending, angularly spaced parts receiving slots formed in an upper surface portion thereof, said slots being open at their inner ends and having their axes sloping downwardly as they pass through the top dead center of the ring, a selector wheel mounted above the collector ring and journaled on an extension of the fixed support for the hopper with its axis of rotation at a greater angle to the horizontal than the hopper axis and being of sufficiently smaller diameter than the inside diameter of the said surface portion of the collector ring to permit the wheel to rotate with its periphery spaced radially inwardly of the inner open ends of the said slots at the top dead centers of the ring and wheel, an annular series of pins equal in number to that of the slots mounted in the periphery of the wheel to extend radially therefrom with the axes of the slots and pins that successively pass through the top dead centers of the ring and wheel being in alignment so that a part positioned in an aligned slot with its open end facing inwardly will be transferred to the aligned pin, means for receiving the parts from the pins as the latter pass through the bottom dead center of the selector wheel, and means for driving the collector ring and the selector wheel at the proper relative speeds to effect the aforesaid alignment of the said slots and pins.

2. A high speed feeder as defined in claim 1 further characterized by said hopper also including an upstanding wall secured to the periphery of the collector ring, and the collector ring body being dished with the series of parts receiving slots being formed in the top surface of the rim of said dished body.

3. A high speed feeder as defined in claim 2 further characterized by a hub fastened to the inner edge portion of the collector ring, a bearing supporting the hub on said fixed support, and a stationary floor plate mounted on said fixed support within the dished part of the collector ring.

4. A high speed feeder as defined in claim 3 further characterized by the stationary floor plate having an opening formed in the upper portion thereof which is symmetrical with the top dead centers of the collector ring and the selector wheel, and the said means for driving the collector ring and the selector wheel including circular series of meshable elements mounted on the collector ring and selector wheel and engaging each other through said floor plate opening.

5. A high speed feeder as defined in claim 4 further characterized by the circular series of meshable elements mounted on the collector ring comprising angularly spaced studs secured to the inner edge portion of the said ring and extending axially upwardly, and the circular series of meshable elements mounted on the selector ring comprising a wheel secured to the bottom portion of the said wheel and having angularly spaced grooves formed therein to receive the said studs.

6. A high speed feeder for tubular parts having only one open end, comprising a hopper mounted on a fixed support for rotation about an axis that is inclined to the horizontal, an annular series of radially extending, angularly spaced parts receiving slots formed in a portion of the upper surface of the hopper bottom, said slots being open at their inner ends and having their axis sloping downwardly as they pass through the top dead center of the hopper, a selector wheel mounted above the hopper bottom and journaled on an extension of the fixed support for the hopper with its axis of rotation at a greater angle to the horizontal than the hopper axis and having a diameter that will permit the wheel to rotate with its periphery spaced radially inwardly of the open inner ends of the said parts receiving slots as the slots pass through the top dead center of the hopper, an annular series of pins equal in number to that of the slots mounted in the periphery of the wheel to extend radially therefrom with the axes of the slots and pins that successively pass through the top dead centers of the hopper and wheel being in alignment so that a part positioned in an aligned slot with its open end facing inwardly will be transferred by gravity to the aligned pin, means for removing the parts from the pins as the latter pass through the bottom dead center of the hopper, means for delivering the removed parts from the hopper, and means for driving the hopper and the selector wheel at the proper relative speeds to effect the aforesaid alignment of the said slots and pins.

7. A high speed feeder as defined in claim 6 further characterized by the means for removing the parts from the pins including a radial flow path for pressurized air formed in the selector wheel in radial alignment with and partially extending alongside of each of said pins, each of said flow paths having an entrance opening at its inner end which passes through the top face of said wheel and a discharge opening at its outer end which passes through the periphery of said wheel adjacent its pin, the entrance openings for all of the flow paths being arranged in a circular series with the series being concentric with the wheel axis, and means mounted on the fixed support for the selector wheel and positioned to be aligned with the entrance opening for the flow path of each pin when said pin is located at the bottom dead center of the said wheel for successively feeding pressurized air to said flow paths.

8. A high speed feeder as defined in claim 7 further characterized by the pressurized air feeding means comprising an arm radially adjustably mounted on the portion of the fixed support on which the selector wheel is journaled and having an outer end portion positioned to be aligned with the path of movement of the entrance opening for the flow path which is located at the bottom dead center of the selector wheel, nozzle means carried by the outer end portion of said arm and including a tip spring pressed against the top face of the said wheel, and a pressurized air supply line connected to the said nozzle means.

9. A high speed feeder as defined in claim 6 further characterized by the means for driving the hopper and the selector wheel including circular series of meshable elements mounted on the hopper bottom and selector wheel and engaging each other only at the top dead center portions of the hopper and wheel.

10. A high speed feeder as defined in claim 9 further characterized by the meshable elements mounted on the hopper bottom comprising angularly spaced studs extending axially upwardly in parallelism with the hopper axis, and the meshable elements mounted on the selector wheel comprising an annular member angularly adjustably fastened to the bottom portion of the wheel and having angularly spaced grooves formed therein to receive the said studs.

11. A high speed feeder for tubular parts having only one open end, comprising a hopper mounted on a fixed support for rotation about an axis that is inclined to the horizontal, an annular series of radially extending, angularly spaced slots formed in a portion of the upper surface of the hopper bottom, said slots each being shaped and arranged to support a single tubular part with its axis arranged radially of the hopper axis and with either one of its ends facing inwardly, all of said slots being open at their inner ends and having their axes sloping downwardly as they pass through the top dead center of the hopper, a member mounted above the hopper bottom and journaled for rotation about an axis that is inclined at a greater angle to the horizontal than the hopper axis, the periphery of the rotatable member being located to pass adjacent to the open inner ends of the parts receiving slots in the hopper bottom at the location of the top dead centers of the hopper and the rotatable member, means carried by the periphery of the rotatable member to enter and support in a radially extending position only the parts which are arranged in said slots with their open ends facing inwardly as the parts pass through to top dead center of the hopper, means for removing the parts from their entering and supporting means as the parts pass through the bottom dead center of the rotatable member, means for delivering the removed parts from the hopper, power means for driving the hopper, and means for driving the rotatable member from the hopper.

12. A high speed feeder as defined in claim 11 further characterized by the means for removing the parts as they pass through the bottom dead center of the rotatable member including means for directing a jet of pressurized air only against the part that is located at said bottom dead center.

13. A high speed feeder for tubular parts having only one open end, comprising a hopper mounted on a support for rotation about a fixed axis, a collector ring formed as a part of the hopper and having an annular series of radially extending, angularly spaced parts receiving slots formed in an upper surface portion thereof, said slots being open at their inner ends and having their axes sloping downwardly as they pass through a given location in their path of travel, a selector wheel mounted above the collector ring and journaled on a part of the support for the hopper with its axis of rotation at an angle to the hopper axis and being of sufficiently smaller diameter than the inside diameter of the said upper surface portion of the collector ring to permit the wheel to rotate with its periphery spaced radially inwardly of the inner open ends of said slots as the latter pass through the aforesaid given location in their path of travel, an annular series of pins equal in number to that of the slots mounted in the periphery of the wheel to extend radially therefrom with the axis of each successive pin being in alignment with and arranged as a continuation of the axis of each successive slot as the latter passes through said given location in its path of travel so that a part positioned in an aligned slot with its open end facing inwardly will be transferred to the corresponding aligned pin, means for removing the parts from the pins as the selector wheel rotates, and means for driving the collector ring and the selector wheel at the proper relative speeds to effect the aforesaid alignment of the said slots and pins.

14. A high speed feeder as defined in claim 13 further characterized by the means for driving the collector ring and the selector wheel including circular series of meshable elements mounted on the ring and the wheel.

15. A high speed feeder as defined in claim 14 further characterized by the meshable elements on the collector ring comprising angularly spaced studs extending axially upwardly in parallelism with the ring axis, and the meshable elements mounted on the selector wheel comprising an annular member angularly adjustably fastened to the wheel and having angularly spaced grooves formed therein to receive the said studs.

16. A high speed feeder as defined in claim 13 further characterized by the means for removing the parts from the pins including means for directing a jet of pressurized air only against the part that is to be removed.

References Cited in the file of this patent

UNITED STATES PATENTS

| | | |
|---|---|---|
| 626,700 | Heinemann et al. | June 13, 1899 |
| 2,715,978 | Sterling | Aug. 23, 1955 |